May 6, 1930.　　　L. A. LAURSEN　　　1,757,376
RUBBER TIRE MOLD
Filed June 22, 1925　　　2 Sheets-Sheet 2
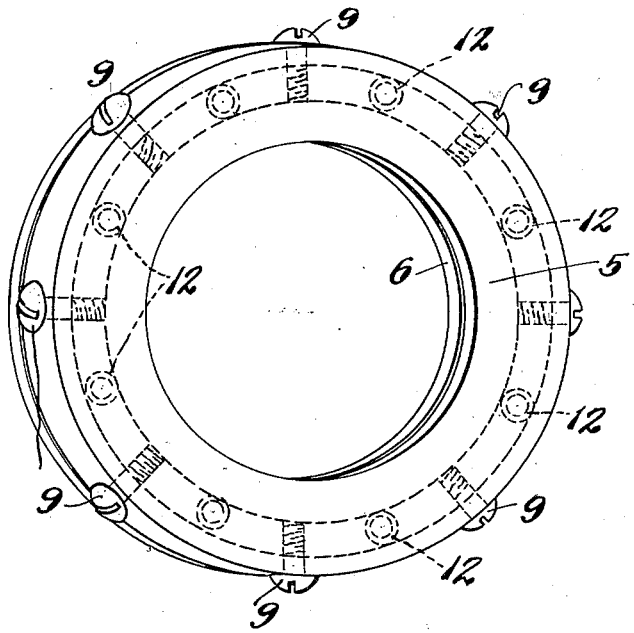
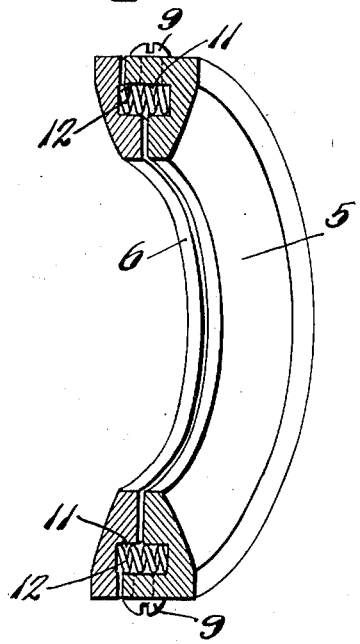
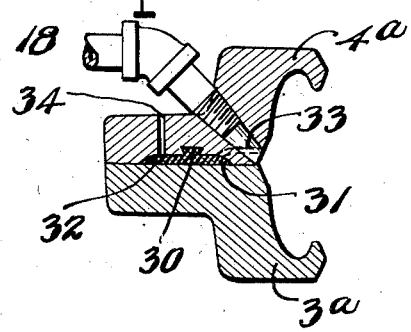
Inventor
L. A. Laursen
By Robb, Robb & Hill
Attorneys Patented May 6, 1930

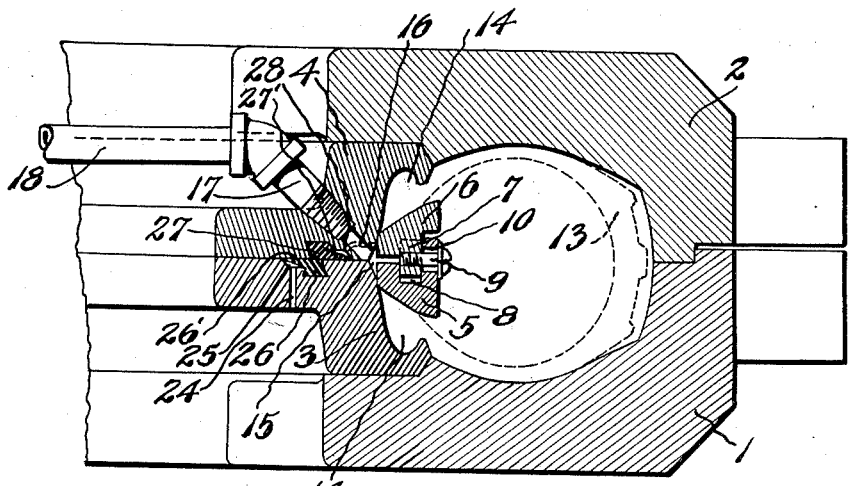
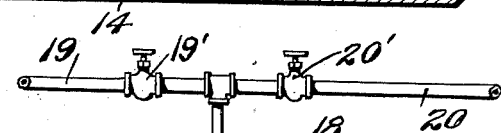
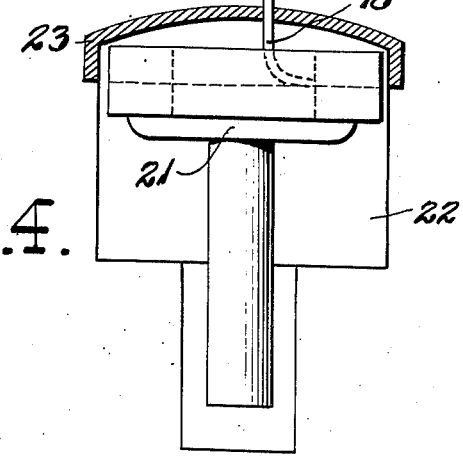

1,757,376

UNITED STATES PATENT OFFICE

LAURITS A. LAURSEN, OF EAU CLAIRE, WISCONSIN, ASSIGNOR OF ONE-FOURTH TO PEARL LUCILE LAURSEN, OF AKRON, OHIO

RUBBER-TIRE MOLD

Application filed June 22, 1925. Serial No. 38,828.

This invention has to do with methods and apparatus for producing pneumatic tires, and the primary object of the invention has been to devise a way in which to dispense with the core, or air bag means, at present so commonly employed in connection with the molds in which tires are ordinarily formed and vulcanized. The employment of the core within the vulcanizing mold, or the air bag method of expanding the tire to cause it to fit hard against the walls of the mold, involve expensive operations that I desire to do away with, utilizing instead hydraulic pressure for accomplishing the same result, preferably by introducing water into the tire when disposed in the mold.

In the carrying out of my invention, the first problem I have undertaken to meet has been the utilization of as much of the mold apparatus now in use as possible. Secondarily, I have had to deal with the proposition of preventing leakage of the water from within the tire and mold once it has been introduced. Additionally, I have made provision, as required, for voiding the chamber, within the tire, to be vulcanized, of air, previous to the introduction of the water, it being well known that unless air is removed, the rubber of the tire will become oxidized in the vulcanizing operation resulting in destruction or deterioration of the tire beyond the point of enabling its use for commercial purposes.

With the foregoing and other specific objects in view that will appear more fully hereinafter, I have devised an apparatus utilizing the present mold body sections and bull ring features of the molding or vulcanizing container for the tires, as now commonly in use. But I have supplemented the bull ring structure with features for preventing the leakage of water from within the tire after introduction, and for preventing passage of air through the bull ring and between the sections thereof, or between the said ring and the mold members. In order to firmly press the base of the tire which comprises the usual beads, against the bull ring parts, I employ a special type of automatically expansible and contractible pressure member in the form of a sectional ring, the sections of which are yieldably mounted on one another and by reason of their relative and expansive movement are adapted to perform certain necessary functions in respect to tires, the base or bead portions of which may happen to be of different sizes.

A full understanding of the present invention will be had upon reference to the following description, in connection to the annexed drawings, in which:

Figure 1 is a sectional view of a tire molding apparatus embodying the invention.

Figure 2 is a perspective view of the pressure member or ring for the mold.

Figure 3 is a fragmentary sectional view showing a segment of the pressure ring to illustrate its specific formation.

Figure 4 is a view showing diagrammatically an ordinary hydraulic ram and illustrating the method of connecting the air exhaust of the water supply means with a mold disposed within the vulcanizing chamber of the ram.

Figure 5 is a sectional view of a modified form of the bull ring.

In the drawings the tire mold of the invention will be of a known type at present in use, but ordinarily employed in conjunction with air bag internal expanding means, or an internal core, features which are eliminated in the practice of this invention. The said mold is comprised of the complemental mold members 1 and 2. There is used in cooperation with the mold members 1 and 2, the bull ring which comprises the sections 3 and 4. In general form this bull ring is also of known construction as to the shape of its parts. Said bull ring closes the inner portion of the mold comprising the members 1 and 2, in the customary manner. Arranged to surround the bull ring and to seat itself against the middle outer portion of the latter is the novel device of my invention which I term a pressure member or ring, composed of the sections 5 and 6. The sections 5 and 6 of the pressure member are movably connected together by the provision of an inner annular rib or tongue 7 projecting from the pressure part 6 into an annular groove or channel 8, on the inner side of the pressure part 5. The parts 7 and 8 simply provide an interlocking and sort of sliding connection between the parts of the pressure member enabling contractive and expansive movements of said parts. To positively connect the parts 5 and 6 of the pressure member, I provide a series of fastenings which are preferably screws 9 that pass through slots 10 at intervals in the part 5 and enter threaded openings suitably formed in the rib or tongue 7 of the part 6. There are provided also at intervals along the rib or tongue 7, openings 11 in which openings as well as the groove or channel 8 are seated a series of springs 12, which springs tend to expand or separate the parts 5 and 6 of the pressure member but readily permit of yieldable movement of said parts toward each other. The springs 12 have sufficient expansive action to cause the parts 5 and 6 of the pressure member to move into and engage hard against the base portions of the tire 13 disposed in the mold 1—2. It is immaterial if the bead portions 14 of the tire 13 are larger or smaller within certain ordinary limits, for notwithstanding such variation, the pressure member 5—6 will function efficiently to hold the beads 14 tightly engaged with the bull ring 3—4. Under these circumstances, the pressure member 5—6 will conform itself to the size of the tire base parts so that if the latter are built a little larger or smaller, it is not material and my present apparatus will work effectively. Where I, as well as others in this art, have heretofore proposed to use rings or means somewhat for the same purpose as my new pressure member 5—6, unsatisfactory results have been caused, for the reason that the tire must be built of an exact size at the bead portions thereof. This is very hard to accomplish for when the beads have been too large, surplus material has been pushed to the top of the pressure ring or device within the tire, thereby forming a ridge; or if the beads were built too small, the resulting interior surface of the tire at the beads is molded with a light rib. The objection of these ribs and ridges is evident to those versed in this art to which my invention appertains. To overcome such objectionable results, and in order that I may vulcanize my tire by the use of water or other hydraulic pressure means therein, I avail of the device or pressure member 5—6 above described, in conjunction with the features of the bull ring 3—4, now to be set forth.

It will be seen that the bull ring 3—4 has an annular clearance space 15 at its longitudinal middle portion and substantially where the pressure member 5—6 seats itself against the ring when the parts are assembled as in Figure 1. Leading to this clearance space 15 of the bull ring is a water and air passage 16 with which is connected the pipe 17. Said pipe 17 is coupled by a flexible hose or other pipe connection 18 with a main water supply pipe 19 and air exhaust pipe 20. The latter are disposed convenient to and preferably adjacent the hydraulic ram 21 in the vulcanizing chamber 22, in fact the pipe 18 passes through the cover 23 of said chamber 22.

Reverting to the bull ring structure, it is noted that the section or part 3 of said bull ring is formed with an air opening or passage 24, leading to a gasket space 25 at the inner face of the said part 3, or in other words the face which fits against the corresponding inner face of the part 4. Disposed on said inner face of the bull ring member 3 is the gasket 26, the body of which is seated in a dove tail groove of the member 3 and is formed with a lateral flap 26', disposed in the clearance space 25.

The bull ring member or section 4 is provided with a gasket 27 formed similarly to the gasket 26 and having a flap 27' like the flap 26', and disposed in the clearance space 28 like the space 25. The flaps and clearance spaces of the two gaskets 26 and 27, however, extend in opposite directions from the groove in parts 3 and 4 in which the gaskets are mounted.

It is noted that the gaskets 26 and 27 are preferably of soft slow cured rubber and that their outer surfaces are flush with the meeting faces of the parts 3 and 4. This is important and necessary for the protection of the gaskets against being damaged or deterioration thereof, in the handling of the bull ring members 3 and 4, which of course, have to be moved around considerably and more or less roughly handled in arranging them for use in a mold apparatus of the class described. Leading from the clearance space 28 laterally to a point of communication with the clearance space 15 between the pressure member 5—6 and the bull ring 3—4 is a water passage 29.

With the foregoing constructional features of the invention presented, its manner of use and the operation thereof may be set forth.

In assembling the mold apparatus and tire therein, the pressure members 5 and 6 are disposed in the tire, and because of their diameter they will assume a position between the beads. Thereupon the bull ring 3—4 is placed in position with its parts engaged over the beads 14 of the tire 13. This accomplished, the tire and the bull ring are disposed between the members 1 and 2 of the mold and the mold is thus closed upon the tire and forces the parts of the bull ring together so as to tightly compress the beads 14 between the bull ring parts 3—4 and the parts 5 and 6 of the pressure member. The springs 12 in the above operation will be compressed so that the parts 5 and 6 of the pressure member will effectively hold the beads hard against the bull ring. The mold, tire, and bull ring as now put together are then placed within the vulcanizing chamber 22 for cooperation with the ram 21, and the pipe 17 is connected up with the pipe 18 which leads to the water supply and air exhaust line pipes 19 and 20. Thereupon the valve 20' of the pipe 20 is opened and the air exhaust means provided for said pipe 20 will be in communication through the pipe 18, pipe 17 and passage 16, with the interior of the tire. The air within the tire is thus withdrawn therefrom and the valve 20' closed. The valve 19' of the pipe 19 is now opened so as to admit water to the space within the tire through the same pipe and passage previously referred to, said water being under pressure.

When the air was withdrawn from the tire, owing to the provision of the passage 24 leading to the atmosphere in the member 3; the exhaust pull of the air drew the flap 26' of the gasket 26 against the bull ring part 4 and prevented any fresh air from entering the tire between the said bull ring parts 3 and 4.

When the water is introduced into the tire 13 by opening the valve 19', the pressure of such water is sufficient, as it passes through the passage 29 to the space 28 behind the flap 27' of the gasket 27, to force said flap 27' firmly against the part 3 of the bull ring so that there will be no leakage of water through the bull ring. Leakage of water past the beads 14 and tire 13 is prevented through the effective pressure of the pressure member parts 5 and 6 against the base portions of the tire forcing the beads 14 into close engagement with the bull ring. In Figure 5, I have illustrated a slightly modified adaptation of the invention wherein the member 4ᵃ of the bull ring cooperates with the other member 3ᵃ substantially as before described, but said member 4ᵃ alone is equipped with a double acting gasket 30 having two flaps 31 and 32, the flap 31 adapted to be acted upon by the water passing through the passage 33 and the flap 32 having associated therewith passage 34 for the same purpose as the previously described passage 24. By this construction I am enabled to use a single gasket 30 to perform the functions of the two gaskets 26 and 27 previously fully described.

It is to be understood, of course, so far as exact details of formation are concerned, the structure of the pressure member 5—6 is susceptible of modification, the essential requirements being that it be expansible and contractible in a somewhat automatic manner to perform the functions for which it is provided. Likewise the bull ring structure may be modified in its construction respecting the location of passages, gasket supporting recesses or grooves, the exact formation of the gaskets themselves, and the arrangement of the pipe connections, etc.

Having thus described my invention what I claim as new and desire to secure by Letters Patent, is:

1. In combination, a rubber tire mold, a bull ring therefor, and a pressure member wholly enclosed by the mold and ring and surrounding the bull ring and adapted to be received in the mold so as to engage with the base portions of the tire disposed therein while permitting fluid pressure to be applied directly to the tire, the said pressure member comprising sections, and means for expanding said sections.

2. In combination, a rubber tire mold, a bull ring therefor, and a pressure member surrounding the bull ring and adapted to be received in the mold so as to engage with the base portions of the tire disposed therein, said pressure member comprising complemental parts, one of the parts having a groove and the other part having a tongue entering said groove, fastenings slidably connecting these said parts of the pressure member, and means for expanding said parts of the pressure member.

3. In combination, a rubber tire mold, a bull ring therefor, and a pressure member surrounding the bull ring and adapted to be received in the mold so as to engage with the base portions of the tire disposed therein, said pressure member comprising complemental parts, one of the parts having a groove and the other part having a tongue entering said groove, fastenings slidably connecting these said parts of the pressure member, and means for expanding said parts of the pressure member, comprising springs disposed at intervals between the parts of the pressure member, permitting yielding together of said parts and normally expanding them into hard engagement with the adjacent base portions of the tire with which they cooperate.

4. In combination, a rubber tire mold, a bull ring for closing the base of the mold and engaging the base of a tire therein, and means for exhausting air from and introducing water into a tire in the mold through the bull ring, a pressure member surrounding the bull ring and adapted to engage the base portions of the tire in the mold to press said portions in air and water tight engagement with the bull ring, and means for positively expanding the pressure member against the base portions of a tire in the mold and engaged with the bull ring.

5. In combination, a rubber tire mold, a bull ring closing the base thereof and made in complemental sections for engaging the base portions for a tire in the mold, and gasket means between the sections of the bull ring for preventing passage of air or water therebetween, and means for exhausting air from the mold in the space encompassed by a tire disposed therein, adapted to act upon said gasket means to seal the bull ring against passage of air between the sections thereof.

6. In combination, a rubber tire mold, a bull ring closing the base thereof, means for introducing water under pressure into mold and withdrawing air therefrom, the said bull ring being made in sections to engage the base portions of a tire in the mold, sealing means between the sections of the bull ring to prevent air and water leakage there-between, and means whereby the air exhaust means for the mold may be caused to act upon said sealing means to cause it to seal the bull ring between its sections against passage of air, together with means for causing the water under pressure introduced into the mold to act upon the sealing means so that the latter will prevent the passage of water between the sections of said bull ring.

7. Apparatus as described in claim 6 characterized in that the sealing means comprises a gasket arrangement between the sections of the bull ring adapted to be directly acted upon by water pressure in the mold or exhaust air suction in said mold.

8. In combination, a mold, a bull ring closing one end thereof, said bull ring having annularly grooved portions therein for the reception of the beads of the tire, parallel annular members between the grooved portions and means yieldably urging the annular members apart to hold the beads of the tires in the grooves, said annular members extending but slightly above the grooved portions of the bull ring and when in holding position leaving the major portion of the interior of the tire unobstructed, and means for admitting fluid to the interior of the tire.

9. In combination, a mold, a bull ring closing one end thereof and having portions annularly grooved to receive the bead portion of the tire to be treated, rigid members lying between the grooved portions and means urging said rigid members yieldably into contact with the beads of a tire located in said grooves.

10. In combination, a mold, a bull ring closing one end thereof and having portions annularly grooved to receive the bead portion of the tire to be treated, rigid members lying between the grooved portions and means urging said rigid members yieldably into contact with the beads of a tire located in said grooves, said rigid members being of a construction to leave the major portion of the interior of the tire unobstructed.

In testimony whereof I affix my signature.

LAURITS A. LAURSEN.